United States Patent [19]

Farr

[11] Patent Number: 4,579,392

[45] Date of Patent: Apr. 1, 1986

[54] LOAD CONSCIOUS BRAKE PRESSURE CONTROL VALVE

[75] Inventor: Glyn P. R. Farr, Leek Wootton, England

[73] Assignee: Lucas Industries public limited company, Birmingham, England

[21] Appl. No.: 635,507

[22] Filed: Jul. 30, 1984

[30] Foreign Application Priority Data

Jul. 29, 1983 [GB] United Kingdom ............... 8320500

[51] Int. Cl.⁴ .............................................. B60T 8/22
[52] U.S. Cl. .................................................. 303/6 C
[58] Field of Search ............... 188/195; 303/6 C, 6 R, 303/22 A, 22 R

[56] References Cited

U.S. PATENT DOCUMENTS

| | | | |
|---|---|---|---|
| 3,149,886 | 9/1964 | Dorner | 303/22 A |
| 3,191,999 | 6/1965 | Cordiano | 303/22 R |
| 4,062,597 | 12/1977 | Sawyer et al. | 303/22 R X |
| 4,150,855 | 4/1979 | Demido | 303/22 R |
| 4,325,581 | 4/1982 | Pickering | 303/22 R |

Primary Examiner—Duane A. Reger
Attorney, Agent, or Firm—Scrivener Clarke Scrivener and Johnson

[57] ABSTRACT

A load conscious brake pressure reduction valve is mounted between the suspension arm (1) and the suspension spring (5) of a vehicle. The control piston (8) of the valve is directly loaded with a force equal to the suspension spring load less the force of a compensating spring (12). To enable the valve to close against this load the area (A) of the control piston is made large. The movement required to effect valve closing is made small by careful control of the projection of the valve opening pin (26) and of the length of the valve seat member (20).

11 Claims, 3 Drawing Figures

4,579,392

LOAD CONSCIOUS BRAKE PRESSURE CONTROL VALVE

This invention relates to a load conscious brake pressure control valve, and in the preferred embodiment provides a load conscious brake pressure reduction valve particularly suitable for reducing the rear brake pressure (as compared with the front brake pressure) of a front wheel drive motor vehicle.

It is well known to incorporate in the hydraulic braking system of a motor car one or more load conscious brake pressure reducing valves. The effect of such valves is that, when the system braking pressure exceeds a certain limit (known as the "cut-in" pressure), any subsequent rise in brake pressure is fully transmitted to the front brakes of the vehicle, but is not fully transmitted to the rear brakes of the vehicle. Such valves include means for sensing the loading of the vehicle in order to modify the cut-in pressure.

One convenient means for sensing the vehicle loading is to detect the spring force present in the vehicle suspension springs. It has previously been considered impracticable to apply the full loading of the suspension spring to the control member of the pressure control valve. Accordingly, various means have been proposed for applying a certain proportion of the spring load to the control valve member. Such arrangements typically include a series of levers (as in U.S. Pat. No. 4,150,855), or the use of some elastomeric proportioning arrangement (as in G.B. No. 1557006) or the use of some hydraulic proportioning arrangement (as in G.B. No. 2100377A). In each case, the aim is to apply a fixed percentage of the vehicle spring load to the control member of the pressure reducing valve so that the total forces to which the control member is subjected are small relative to the typical vehicle spring loading, but are nonetheless proportional to the vehicle spring loading.

While the need for some spring load proportioning arrangement has generally been accepted, such arrangements are known to suffer from a number of disadvantages. Firstly, components must generally be manufactured to fairly critical tolerances to ensure that the load applied to the control member is the desired proportion of the total spring load. Also, although the proportioning arrangement as manufactured may function satisfactorily, during the lifetime of the vehicle performance inevitably decreases unless regular replacement of critical components and/or re-setting of critical values is undertaken.

According to one aspect of the present invention there is provided a load conscious brake pressure control valve assembly comprising: a valve body; a brake fluid inlet in the valve body; a brake fluid outlet in the valve body; a control piston slidably mounted in the valve body for controlling communication between the inlet and the outlet, the control piston being urged by brake pressure within the valve body in the direction tending to isolate the outlet from the inlet; a rigid force transmitting spring seat rigidly connected to the control piston and defining a seat for a vehicle suspension spring whereby, in use, the spring force of the suspension spring urges the control piston in the direction opposite to that in which it is urged by brake pressure within the valve body; and a compensating spring acting on the control piston in the sense to oppose the suspension spring whereby the net force applied to the control piston is equal to the difference between the force of the suspension spring and the force of the compensating spring.

In this invention no proportioning arrangement is used to apply a proportion of the vehicle suspension spring load to the control member, and accordingly the problems outlined above associated with the use of proportioning arrangements are overcome. The control valve assembly is accordingly particularly inexpensive to manufacture and reliable and consistent in service.

In the case of the invention, the net force applied to the control piston is equal to the total suspension spring force less the force of the compensating spring. In the preferred embodiment movement of the control piston is very small, and accordingly the compensating spring is of substantially constant length and applies a substantially constant force to the piston. Thus, the net force applied to the control piston is equal to the vehicle suspension spring load, which will vary in accordance with both static and dynamic loading of the vehicle, less a fixed constant value.

In order to enable the control piston to move at the desired cut-in pressure against the relatively large spring force to which it is subject, the piston has a relatively large effective cross-sectional area. It would normally be assumed that a large cross-sectional area for such a piston is undesirable because movement of the piston would absorb a significant volume of brake applying fluid. This problem is overcome in the case of the preferred embodiment by careful control of the tolerances associated with the valve manufacture whereby total axial displacement of the control piston is maintained very small, and accordingly the total volume of fluid absorbed from the braking system upon movement of the control piston is acceptably small.

The invention will be better understood from the following description of a preferred embodiment thereof, given by way of example only, reference being had to the accompanying drawings wherein.

Figure 1:
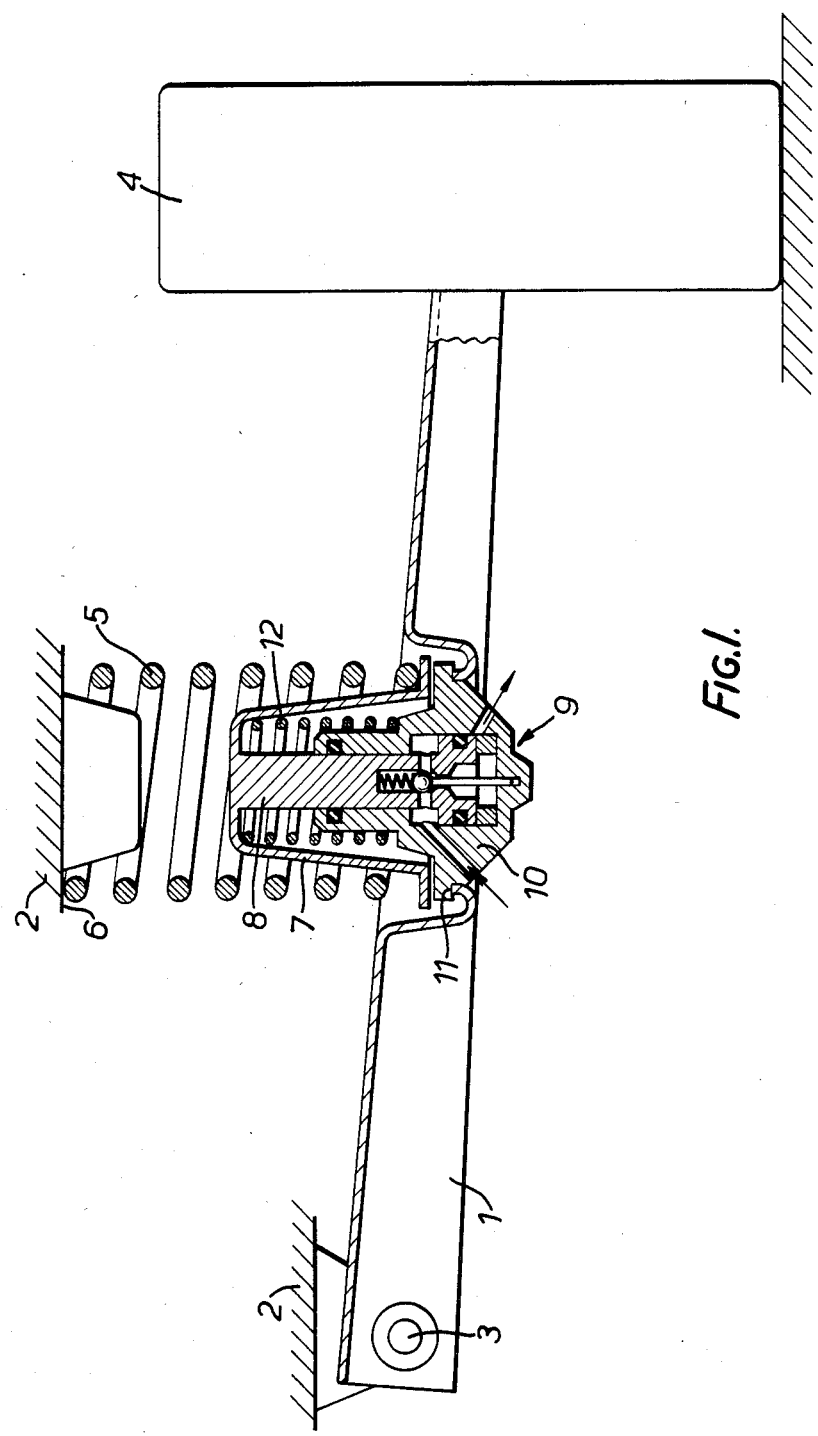
FIG. 1 is a schematic view showing a preferred embodiment of the present invention installed in a vehicle suspension system.

Referring firstly to FIG. 1, the suspension system of one rear wheel of a front wheel drive vehicle is shown. The suspension system comprises an arm 1 pivotally mounted on the body 2 of the vehicle for vertical movement about an axis 3. The road wheel 4 is mounted at the end of the arm 1 in conventional manner and a coil spring 5 is provided acting between an upper spring seat 6 and lower spring seat 7 to provide suitable ride characteristics for the vehicle.

The lower spring seat 7 is not rigidly connected to the suspension arm 1, but rather is rigidly secured to the control piston 8 of a load conscious pressure reducing valve 9. The body 10 of the valve is mounted on a suitable seat 11 provided on the arm 1. A compensating spring 12 acts between the valve body 10 and the spring seat 7 whereby a part of the load of the suspension spring 5 is reacted onto the body 10 via the compensating spring 12, and the net force acting on the control piston 8, in the downward direction, is equal to the difference between the force exerted by the suspension spring 5 and the compensating spring 12.

Figure 2:
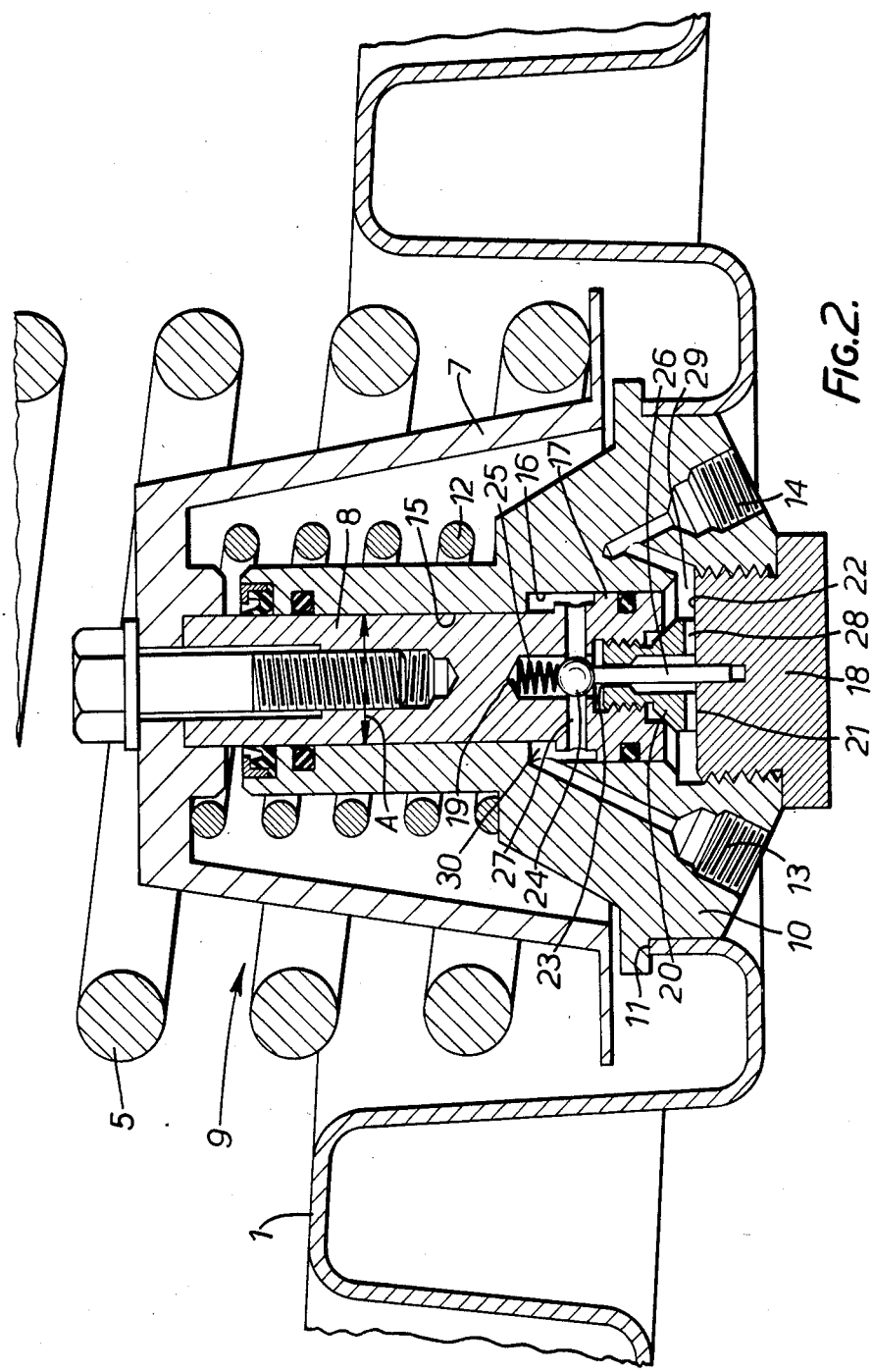
FIG. 2 is a detailed view of the load conscious pressure control valve.
Figure 3:
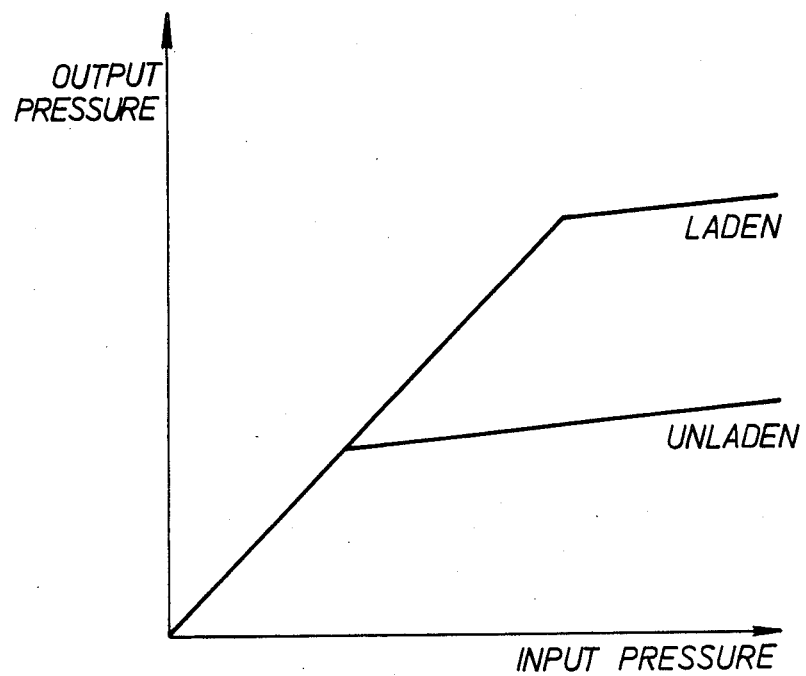
FIG. 3 illustrates the operating characteristics of the valve illustrated in FIG. 2.

Referring now to FIG. 2 there is shown an enlarged cross-section of the valve 9. The valve body 10 includes a hydraulic fluid inlet 13 for connection to a source of brake applying fluid, and a hydraulic fluid outlet 14 for connection to one or more rear brakes. The inlet 13 and outlet 14 communicate with a stepped bore in the valve body having an upper portion 15 having a cross-sectional area A, and a portion 16 having a diameter larger than that of the portion 15.

The control piston 8 is slidingly and sealingly mounted in the upper portion 15 of the stepped bore and carries an enlarged head 17 which is slidingly and sealingly mounted in the lower portion 16 of the bore. The stepped bore is closed at the lower end thereof by a closure plug 18.

A bore 19 is formed in the control piston 8 and is closed by an end plug 20 having a lower face 21 which can engage the upper face 22 of the plug 18. The plug 20 includes a central bore the upper end of which defines a valve seat 23 against which a valve closure member 24 is urged by a valve spring 25. A pin 26 is secured to the end plug 18 and extends above the face 22 by such a distance that, when the faces 21 and 22 are in engagement, the valve closure member 24 is held clear of the seat 23 by a small and accurately controlled amount, for example 0.2 mm. With the components in this configuration a passage is established between the hydraulic fluid inlet 13 and hydraulic fluid outlet 14 by way of an inlet chamber 26, radial passages 27 in the control piston 8, the central bore of the plug 20, radial slots 28 formed in the lower end of the plug 20, and an outlet chamber 29.

Under normal loading conditions, when the brakes are not applied, the force exerted by the suspension spring 5 on the spring seat 7 (S) will be greater than the force exerted on the spring seat 7 by the compensating spring 12 (K) and accordingly there will be a net force (S−K) acting downwardly on the control piston 8. This will cause the faces 21 and 22 to remain in engagement and establish communication between the inlet 13 and the outlet 14.

When the brakes are applied the pressure (P) within the lower bore portion 16 will rise until the net upward force on the control piston is equal to the net downward spring force. Thereupon, the piston 8 will rise allowing the valve member 24 to seat and interrupt communication between the inlet 13 and outlet 14. At the moment of closure the following equation will be satisfied:

$$S-K=PA.$$

Thereafter, any further increase in pressure at the inlet 13 will result in a relatively lower increased pressure at the outlet 14 as will be well understood by those skilled in the art.

It will be noted that a very small movement of the piston 8 (0.2 mm in the example given above) is necessary in order to bring the valve member 24 into engagement with its associated seat 23. This has a number of consequences.

Firstly, the compensating spring 12 is subject, in use, to very little deflection, and accordingly operates to apply a substantially constant spring force to the seat 7. Thus the net spring force applied to the control piston will be equal to the suspension spring force, which varies in accordance with vehicle loading, less a constant value. The spring load applied to the control piston 8 will accordingly directly reflect vehicle loading.

Secondly, although the effective area A of the control piston 8 will in general be relatively large (typically 500 mm$^2$ or more) the small movement of the piston means that, upon piston movement, a very small volume of fluid is absorbed by the control valve. Thus, pedal travel is kept within reasonable bounds.

The very small movement which the piston is required to make can readily and accurately be controlled since it is determined exclusively by the amount which the pin 26 projects above the face 22 of the end plug 18, and the overall axial length of the closure plug 20. These two factors can readily be controlled to accurate tolerances. The relatively large diameter of the piston 8 offers the advantage that seal friction tending to prevent movement of the piston is of relatively little consequence. This enables the cut-in pressure to be accurately controlled, and for a relatively low cut-in pressure to be achieved. This in turn enables cut-in pressure to be selected to more accurately reflect the ideal conditions over a wide range of vehicle loadings. For example, in the case of a vehicle in which the suspension spring loading is 2960N under driver only conditions, and 4286N under fully laden conditions it is possible to achieve a desirable driver only cut-in pressure of 1.5N mm$^{-2}$, and a fully laden cut-in pressure of 4.0N mm$^{-2}$. This is achieved by using a compensating piston area A of 552 mm$^2$ and a compensating spring force K of 2078N.

In addition to the advantages noted above the particular sizes of the components offer the additional advantages that, during rapid braking, the very small controlled valve clearance offers a restriction in the flow of fluid to the rear brakes which prevents the initial brake pressure applied to the rear brakes rising above the desired level due to a pressure overshoot effect. Further, in the event that, after cut-in pressure is reached, the load on the rear suspension is reduced due to cornering or heavy braking, the brake pressure at the outlet 14 will be reduced rapidly because a relatively small movement of the piston 8 will effect a large increase in the volume of the outlet chamber 29.

I claim:

1. A load conscious brake pressure control valve assembly comprising: a valve body; a brake fluid inlet in the valve body; a brake fluid outlet in the valve body; a control piston slidably mounted in the valve body for controlling communication between the inlet and the outlet, the control piston being urged by brake pressure within the valve body in the direction tending to isolate the outlet from the inlet; a rigid force transmitting spring seat rigidly and directly connected to the control piston and defining a seat for a vehicle suspension spring whereby, in use, the spring force of the suspension spring urges the control piston in the direction opposite to that in which it is urged by brake pressure within the valve body; and a compensating spring acting directly on the control piston in the sense to oppose the suspension spring whereby the net force applied to the control piston is equal to the difference between the force of the suspension spring and the force of the compensating spring.

2. A control valve assembly according to claim 1 wherein the inlet is normally in communication with the outlet and the movement of the control piston necessary to interrupt such communication is small whereby the compensating spring substantially does not change in length upon movement of the control piston in use.

3. A control valve assembly according to claim 1 wherein the inlet is normally in communication with the outlet and in this normally open state of the assembly the control piston axially abuts the valve body to transfer to the valve body the said net force applied to the control piston.

4. A control valve assembly according to claim 1 or claim 2 wherein the control piston defines a valve seat closable by a closure member housed within the control piston to interrupt communication between the inlet and the outlet.

5. A control valve assembly according to claim 4 wherein a pin, secured to the valve body, holds the closure member spaced from the seat when the control valve is in its normal state.

6. A control valve assembly according to claim 5 wherein an end face of the control piston abuts the valve body surrounding the pin when the control valve is in its normal state to transfer to the valve body the said net force applied to the control piston.

7. A control valve assembly according to claim 6 wherein the control piston includes a piston body and an end plug secured to the piston body and closing an axial bore formed in the piston body, the valve seat being formed on the inner end of the end plug, and the end plug being effective to retain the closure member within the axial bore.

8. A control valve assembly according to claim 7 wherein the end face of the control piston which abuts the valve body is an end face of the end plug, whereby the distance from that end face of the control piston which abuts the valve body to the valve seat is equal to the length of the end plug, and the amount by which the closure member is held spaced from its associated seat in the normal open state of the valve is equal to the difference between the projecting length of the pin and the length of the end plug.

9. A control valve assembly according to claim 1 or claim 2 wherein the valve body is adapted to be mounted on a suspension arm such that the entire load of the associated suspension spring is transferred to the suspension arm via the valve body.

10. A control valve assembly according to claim 1 or claim 2 wherein the control piston bounds an outlet chamber which is permanently connected to the fluid outlet and the volume of which increases in response to movement of the control piston produced, in use, by a reduction in the load on the suspension spring after the control valve has closed.

11. A control valve assembly according to claim 1 or claim 2 wherein the compensating spring acts between the spring seat and the valve body.

* * * * *